(12) United States Patent
Bitz et al.

(10) Patent No.: US 8,177,245 B2
(45) Date of Patent: May 15, 2012

(54) TWIST-BEAM REAR AXLE COMPRISING AN ADDITIONAL WATT LINKAGE

(75) Inventors: Gerd Bitz, Mainz (DE); Werner Brinker, Darmstadt (DE); Dirk Ehrlich, Bodenheim (DE); Michael Harder, Bodenheim (DE); Matthew S. Purdy, Royal Oak, MI (US); Wolfgang Stoff, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 384 days.

(21) Appl. No.: 12/374,636

(22) PCT Filed: Jul. 20, 2007

(86) PCT No.: PCT/DE2007/001303
§ 371 (c)(1),
(2), (4) Date: Nov. 9, 2009

(87) PCT Pub. No.: WO2008/009285
PCT Pub. Date: Jan. 24, 2008

(65) Prior Publication Data
US 2010/0052281 A1 Mar. 4, 2010

(30) Foreign Application Priority Data
Jul. 21, 2006 (DE) .......................... 10 2006 033 755

(51) Int. Cl.
*B60G 21/05* (2006.01)
*B60G 21/055* (2006.01)
(52) U.S. Cl. ... 280/124.128; 280/124.116; 280/124.106; 280/124.107
(58) Field of Classification Search ........... 280/124.128, 280/124.106, 124.116, 124.107
See application file for complete search history.

(56) References Cited

U.S. PATENT DOCUMENTS

| 4,589,677 | A | * | 5/1986 | Matschinsky | .......... 280/124.156 |
| 5,566,969 | A |  | 10/1996 | Tattermusch |  |
| 6,142,494 | A | * | 11/2000 | Higuchi | ..................... 280/93.51 |
| 2004/0262985 | A1 |  | 12/2004 | Nicolas |  |
| 2011/0031712 | A1 | * | 2/2011 | Bitz et al. | ............... 280/124.106 |
| 2011/0127744 | A1 |  | 6/2011 | Siebeneick et al. |  |

FOREIGN PATENT DOCUMENTS

| DE | 27424226 A1 | 3/1979 |
| DE | 4419221 C1 | 7/1995 |
| DE | 19833399 C1 | 10/1999 |
| DE | 60204330 T2 | 2/2006 |
| DE | 102004041737 A1 | 3/2006 |
| DE | 102009031846 A1 | 1/2011 |
| DE | 102009043552 A1 | 4/2011 |

(Continued)

*Primary Examiner* — Ruth Ilan
(74) *Attorney, Agent, or Firm* — Ingrassia Fisher & Lorenz, P.C.

(57) ABSTRACT

A suspension is provided for non-steered wheels on a motor vehicle body. The suspension includes, but is not limited to a twist-beam rear axle with a Watt linkage. A top rocker arm of the Watt linkage is mounted on the motor vehicle body. The Watt linkage prevents the motor vehicle from oversteering during cornering. The damping bushes can be disconnected in part from wheel-guiding functions as the Watt linkage performs a major part of the wheel guiding functions, which leaves some freedom for designing the characteristics so as to significantly increase motoring comfort.

4 Claims, 2 Drawing Sheets

FOREIGN PATENT DOCUMENTS

| | | | |
|---|---|---|---|
| FR | 2612460 | A1 | 9/1988 |
| FR | 2634696 | A1 | 2/1990 |
| FR | 2860751 | A1 | 4/2005 |
| FR | 2864471 | A1 | 7/2005 |
| JP | 1309813 | A | 12/1989 |
| JP | 2001080329 | A | 3/2001 |

* cited by examiner

TWIST-BEAM REAR AXLE COMPRISING AN ADDITIONAL WATT LINKAGE

CROSS-REFERENCE TO RELATED APPLICATIONS

This application is a U.S. National-Stage entry under 35 U.S.C. §371 based on International Application No. PCT/DE2007/001303, filed Jul. 20, 2007, which was published under PCT Article 21(2) and which claims priority to German Application No. 102006033755.7, filed Jul. 21, 2006, which are all hereby incorporated in their entirety by reference.

TECHNICAL FIELD

The invention relates to a suspension for non-steered wheels on a motor vehicle body of a motor vehicle with two trailing arms and a rod connecting the trailing arms with one another, wherein the trailing arms on one end have a mounting on the motor vehicle body, with a Watt linkage connecting the trailing arms with one another, with flanges for carrying the wheels, and with a spring/damping device for supporting the trailing arms on the motor vehicle body.

BACKGROUND

Such a suspension is known, for example, from DE 27 42 426 A1. For this suspension, the rod is formed as a rigid axle and connects the flanges of the wheels with one another. The trailing arms are connected with one end directly to the rod. The spring struts of the spring/damping device are supported at the Watt linkage. However, this suspension has a low motoring comfort only.

Therefore, in practice, twist-beam rear axles became known which have the rod connected to the vehicle body between the flanges and the mountings of the trailing arms. This twist-beam rear axle, however, has the disadvantage to tend to lateral-force-oversteering.

The invention is based on the problem to develop a suspension of the type mentioned above in such a manner that it has a particularly high motoring comfort and that a lateral-force-oversteering is prevented to a large extent.

SUMMARY

This problem is solved according to an embodiment of the invention in that the trailing arm and the rod are formed as a twist-beam rear axle with a connection of the rod to the trailing arms, wherein the connection is spaced apart from the flanges for carrying the wheels, that the trailing arms have sections projecting beyond the flanges for carrying the wheels, and that the Watt linkage is linked to the projecting sections of the trailing arms.

By means of this construction, lateral forces of the twist-beam rear axle are not only supported by the mountings of the trailing arms at the motor vehicle body, but, in addition, by the Watt linkage. Hence, in comparison to the known twist-beam rear axle, the mountings of the trailing arms can be designed resiliently, which contributes to a further increase of the motoring comfort. A tendency of the twist-beam rear axle for lateral-force-oversteering is avoided by the Watt linkage.

The suspension according to an embodiment of the invention has a particularly high motoring comfort when the spring/damping device is linked respectively between the Watt linkage and the connection of the rod to the trailing arms.

The connection of the Watt linkage to the trailing arms proves to be particularly simple with respect to the design according to another advantageous development of the invention when the trailing arms have cantilevers facing one another. The design of the cantilevers results in addition in a very short and hence light Watt linkage.

The suspension according to an embodiment of the invention can be installed in a particularly simple manner when mounting parts of the Watt linkage are attached to the cantilevers facing one another of the trailing arms.

The Watt linkage of the suspension according to an embodiment of the invention can be produced and installed in a particularly inexpensive manner when two bars of the Watt linkage are mounted at the mounting parts and are connected to one another by means of a top rocker arm at their end facing away from the mounting parts, and when the top rocker arm is mounted on the motor vehicle body.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
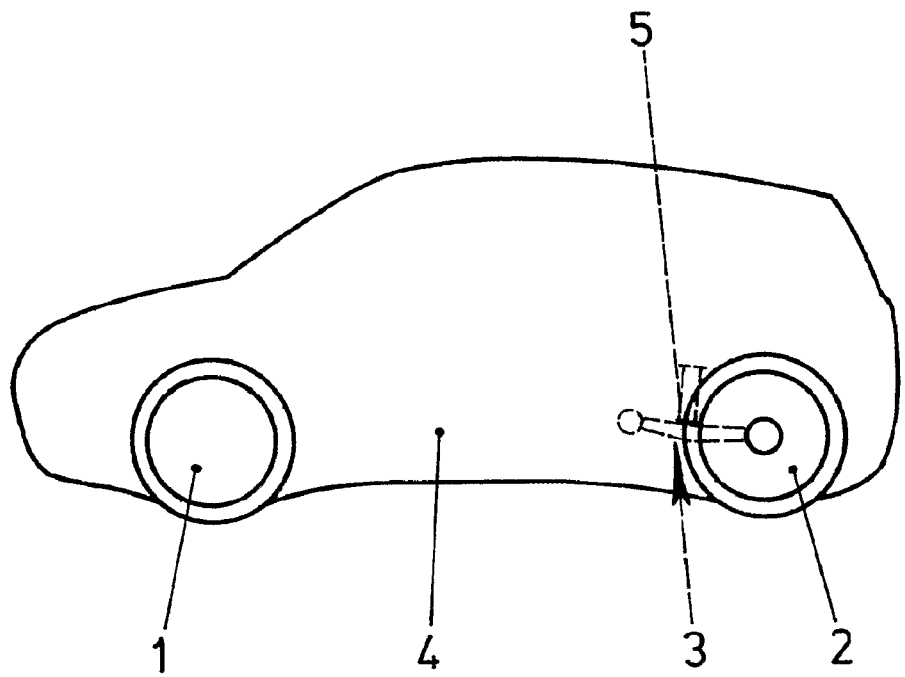
FIG. 1 shows a motor vehicle with a suspension according to an embodiment of the invention in a side view.

FIG. 1 shows a motor vehicle with steered wheels 1 and with non-steered wheels 2. The non-steered wheels 2 are connected to the motor vehicle body 4 by means of a suspension 3. The suspension 3 has spring/damping device 5 which is supported at the motor vehicle body 4.

Figure 2:
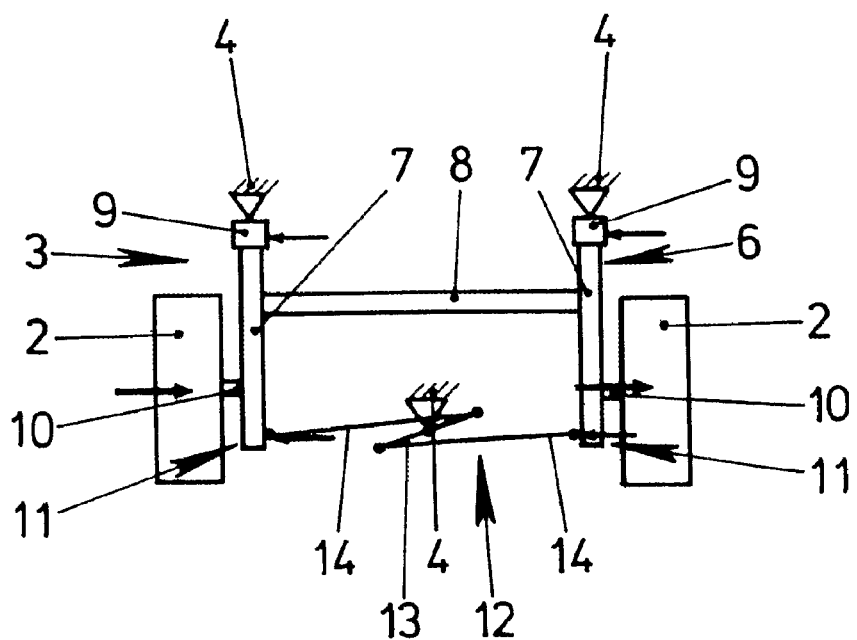
FIG. 2 shows a schematic illustration of the suspension according to an embodiment of the invention of FIG. 1.

FIG. 2 shows schematically in a top view of the suspension 3 that the non-steered wheels 2 are connected to the motor vehicle body 4 by means of a twist-beam rear axle 6. The twist-beam rear axle 6 has two trailing arms 7 and one rod 8 connecting the trailing arms 7 with one another. On one end, the trailing arms 7 are connected with the motor vehicle body 4 by means of mountings 9. The rod 8 is linked with the trailing arms 7 between a connection 10 of the trailing arms 7 to the wheels 2 and the mountings 9. The trailing arms 7 have a section 11 projecting beyond the connection 10 of the wheels 2. A Watt linkage 12 is linked to the projecting section 11. The Watt linkage 12 has two bars 14 which are mounted on the trailing arms 7 and on a centrically arranged top rocker arm 13. The top rocker arm 13 is mounted centrically on the motor vehicle body 4. Furthermore, the lateral forces acting on the non-steered wheels 2 during cornering of the motor vehicle shown in FIG. 1, and the counter forces of the mountings 9 of the twist-beam rear axle 6 on the motor vehicle body 4 as well as of the Watt linkage 12 are illustrated by means of arrows in FIG. 2.

Figure 3:
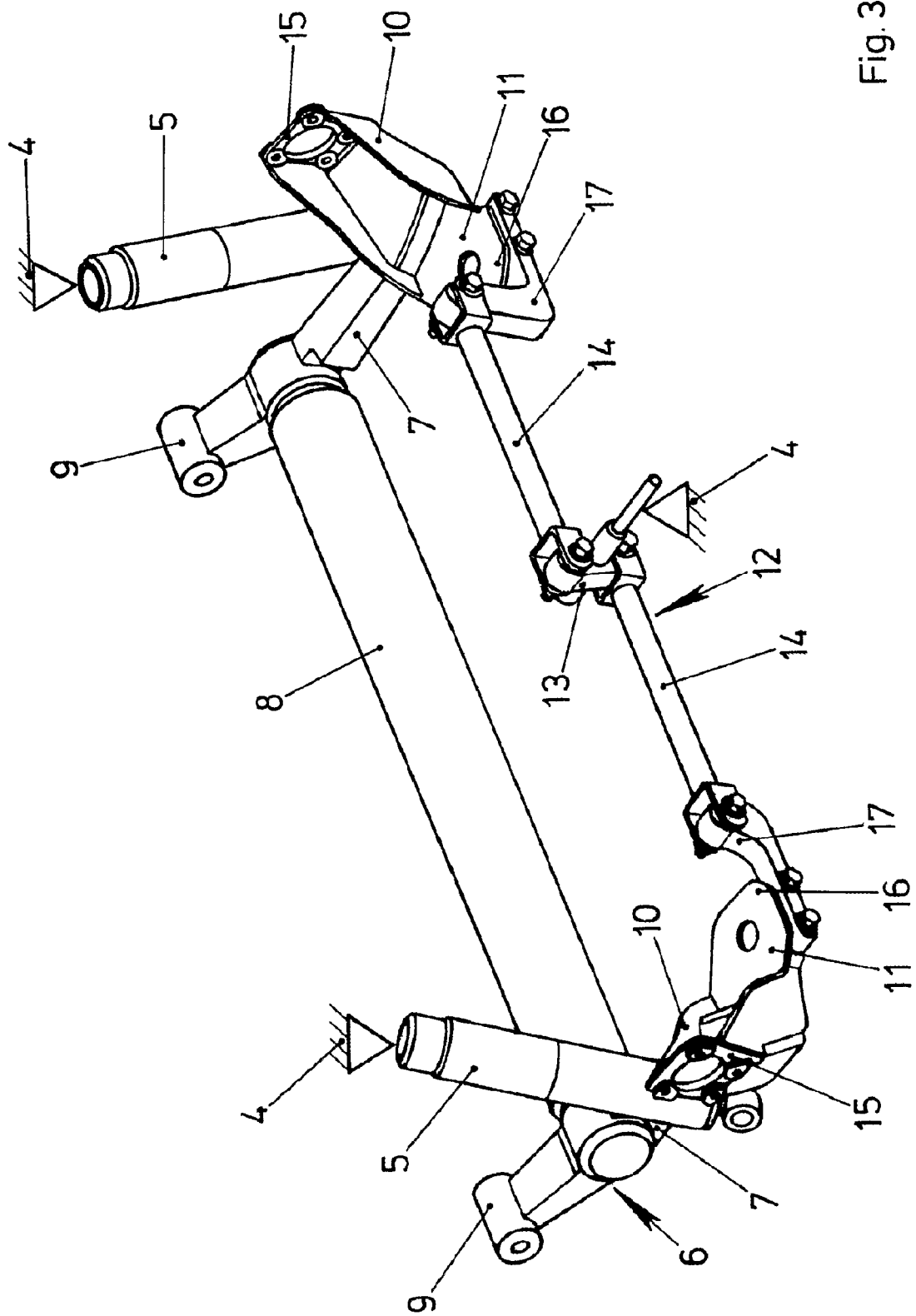
FIG. 3 shows a perspective illustration of the suspension according to an embodiment of the invention.

FIG. 3 shows the twist-beam rear axle 6 of FIG. 2 in a perspective view. Here is shown that the connection 10 of the trailing arms 7 has flanges 15 for the non-steered wheels 2 shown in FIG. 1 for their attachment. On their ends facing away from the mountings 9, the trailing arms 7 have cantilevers 16 which face one another and at which mounting parts 17 of the Watt linkage 12 are attached. The bars 14 of the Watt linkage 12 are mounted at the mounting parts 17. The spring/damping device 5 is linked between the flanges 15 for the wheels 2 and the mountings 9 at the motor vehicle body 4 to the trailing arms 7.

The Watt linkage 12 can also be arranged at a different angle than the one which is shown. Through the selection of the angle and the connection point of the Watt linkage 12 to the trailing arms 7, potential asymmetries can be compensated and, in addition, package advantages of the suspension 3 can be achieved.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. A suspension for non-steered wheels on a motor vehicle body of a motor vehicle, comprising:
   at least two trailing arms having mountings on the motor vehicle body and flanges for carrying the non-steered wheels, the at least two trailing arms having sections projecting beyond the flanges for carrying the non-steered wheels with cantilevers extending along a generally horizontal plane and disposed on the projecting sections, the cantilevers facing one another;
   a rod connecting the at least two trailing arms;
   a Watt linkage connecting the at least two trailing arms, and
   a spring/damping device for supporting the at least two trailing arms on the motor vehicle body,
   wherein the at least two trailing arms and the rod are formed as a twist-beam rear axle with a connection of the rod to the at least two trailing arms,
   wherein the connection is spaced apart from the flanges for carrying the non-steered wheels, and wherein the Watt linkage is linked to the cantilevers of the at least two trailing arms.

2. The suspension according to claim 1, wherein the spring/damper devices are respectively linked to the at least two trailing arms between the Watt linkage and the connection of the rod to the at least two trailing arms.

3. The suspension according to claim 1, wherein at least two bars of the Watt linkage are mounted at mounting parts and connected with one another on ends facing away from the mounting parts with a top rocker arm and the top rocker arm is mounted on the motor vehicle body.

4. The suspension according to claim 1, wherein the rod is connected with the trailing arms between the flanges for carrying the non-steered wheels and the mountings.

* * * * *